United States Patent Office 3,560,843
Patented Feb. 2, 1971

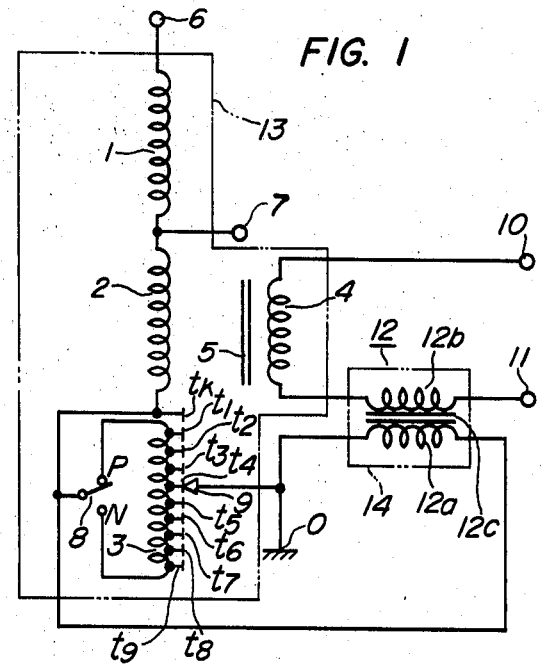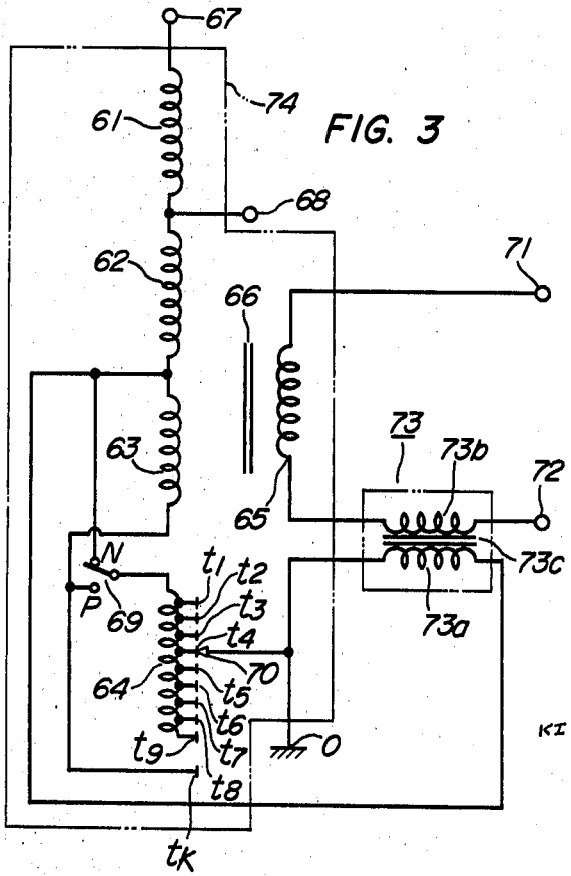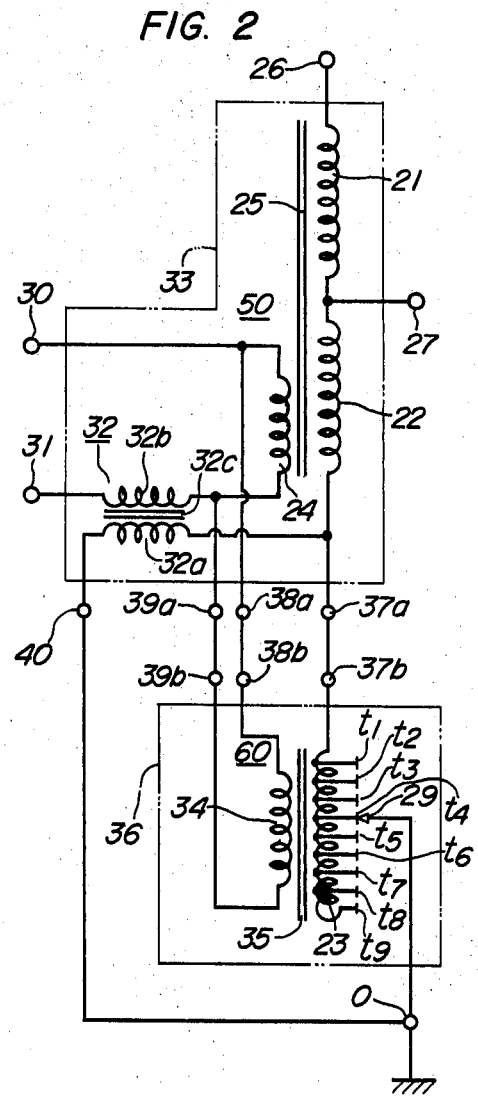

3,560,843
TAPPED AUTOTRANSFORMER VOLTAGE REGULATOR WHEREIN AN AUXILIARY TRANSFORMER COMPENSATES FOR FLUCTUATING VOLTAGE
Kiyoshi Nakagawa, Yoshitake Kashima, and Teruo Fukuda, Hitachi-shi, Japan, assignors to Hitachi, Ltd., Tokyo, Japan, a corporation of Japan
Filed July 11, 1969, Ser. No. 840,951
Claims priority, application Japan, July 12, 1968,
43/48,491
Int. Cl. G05f 1/10; H02p 13/06
U.S. Cl. 323—43.5                                    7 Claims

ABSTRACT OF THE DISCLOSURE

In an autotransformer having a tertiary winding and a tap winding, voltage regulation by means of the tap winding results in a wide variation of the voltage of the tertiary winding. In the present invention, a compensating transformer is provided on the side of the tertiary winding so as to thereby statically and automatically compensate for the variation in the voltage of the tertiary winding due to tap changing on the tap winding.

BACKGROUND OF THE INVENTION

Field of the invention

This invention relates to improvements in an autotransformer of the kind having a tertiary winding and a tap winding for voltage regulation.

Description of the prior art

Power transmission voltages are being progressively raised to deal with the growing demand for more power and power transmission lines for ultrahigh voltages are being built extensively. An autotransformer is frequently used to interconnect such a power transmission line for ultra-high voltage with an existing power transmission line for extra-high voltage. Commonly, the autotransformer is provided with a tertiary winding so that the tertiary winding can feed another load such as, for example, the electrical power supply for a substation. In some cases, a static condenser or reactor is connected with the tertiary winding for compensating for the power factor of the transmission line.

It is also common practice to connect a tap winding in series with the series winding and the common winding of the autotransformer and to regulate the taps of the tap winding for the sake of voltage regulation of the power transmission line. This tap winding is commonly disposed on the secondary terminal side of the autotransformer when the voltage is low. However, in an ultrahigh voltage transformer, the secondary voltage is as high as 154 kilovolts to 275 kilovolts and heavy insulation must be provided on an on-load tap changer and tap leads. It is therefore common practice to dispose the tap winding on the side of a neutral point.

In the autotransformer thus having a tap winding disposed on the side of a neutral point, the number of turns of the windings connected in series with each other is increased or decreased depending on the tap changing and this gives rise to a variation in the magnetic flux density in the iron core resulting in a variation in the voltages induced in the windings in each tap changing operation. The voltage induced in the series winding and the common winding can be kept at a predetermined value by changing over the taps of the tap winding for varying the turns ratio of these two windings. However, the voltage induced in the tertiary winding is placed in a fluctuating state. Thus, it is impossible to effect the power-factor compensaton by means of the tertiary winding as well as to feed other load from the tertiary winding. As a means for minimizing the undesirable voltage variation in the tertiary winding, an on-load tap changer may be provided on the tertiary winding in order to compensate for the variation in the voltage of the tertiary winding. However, due to the fact that the tertiary winding is commonly designed to operate with a low voltage and a large current, the on-load tap changer must have a high current capacity and a large size which is uneconomical. Further, owing to the fact that the on-load tap changer is provided with moving parts, its structure becomes quite complex and it must be periodically checked for the sake of maintenance.

SUMMARY OF THE INVENTION

It is an object of the present invention to provide an autotransformer apparatus in which the voltage induced in a tertiary winding which is subject to fluctuation depending on the changing of tappings can statically and automatically be compensated without the use of an on-load tap changer so as to maintain the voltage induced in the tertiary winding at a substantially constant value.

Another object of the present invention is to provide an autotransformer apparatus which consists of a main transformer and a regulating transformer which are independent of each other so as to facilitate the assembly and transportation of an autotransformer of large capacity.

In accordance with the present invention, the above objects can be attained by the provision of a compensating transformer of the two-winding type having a predetermined turns ratio, the compensating transformer being connected at its secondary side in series with the circuit of the tertiary winding and at its primary side with an operating tap winding of the autotransformer to be energized thereby.

The present invention is also applicable to a tap changing system in which a polarity reversing switch is provided on the tap winding as a means for voltage regulation and the polarity of the tap winding is reversed in the course of the tap changing so as to effect voltage regulation over stages which are substantially twice as many as the number of taps.

The present invention is also applicable to a tap changing system in which the tap winding consists of a coarse tap winding and a close tap winding and the coarse tap winding is connected with or disconnected from the close tap winding by a transfer switch so as to effect voltage regulation over stages which are substantially twice as many as the number of taps.

With the increase in the interconnection capacity of different voltage transmission systems, the capacity of the autotransformer of this kind is also increased with the result that it is difficult to construct the autotransformer as a single unit and to transport same in the assembled state from the factory to the place of installation. However, in accordance with the present invention in which the autotransformer is divided into a main transformer including a series winding, a common winding and a teritary winding, and a regulating transformer including a tap winding and an energizing winding therefor, the main transformer and the regulating transformer can be accommodated in independent containers so as to overcome the existing limit of assembling and transportation. In this case, the compensating transformer may be accommodated in the container of the main transformer or the container of the regulating transformer. This gives an advantage that a special container for the compensating transformer is dispensed with.

The present invention is similarly applicable to a case in which the tap winding is connected across the common winding and a neutral point or a case in which the tap winding is connected across the series winding and the common winding. In this conection, it is desirable to dispose the tap winding on the neutral point side of the common winding in order to simplify the structure of the insulation for the tap leads and an on-load tap changer for changing over the taps of the tap winding.

BRIEF DESCRIPTION OF THE DRAWINGS

FIG. 1 is a connection diagram of an embodiment of the autotransformer according to the present invention employing a tap changing system using a polarity reversing switch.

FIG. 2 is a connection diagram of another embodiment of the present invention in which the autotransformer is separated into a main transformer and a regulating transformer.

FIG. 3 is a connection diagram of a further embodiment of the present invention employing a tap changing system using a transfer switch.

DESCRIPTION OF THE PREFERRED EMBODIMENTS

The present invention will more clearly be understood from preferred embodiments thereof described hereinbelow.

While the preferred embodiments are illustrated as single-phase apparatus, it will be apparent to those skilled in the art that a three-phase apparatus may be constructed in a similar manner.

Referring to FIG. 1, the autotransformer apparatus includes a series winding 1, a common winding 2, a tap winding 3, a tertiary winding coupled magnetically to these windings, and an iron core 5. A high-voltage terminal 6 is provided at one end of the series winding 1, and the other end of the series winding 1 is connected in series with one end of the common winding 2. A low-voltage terminal 7 is connected to the junction between the series winding 1 and the common winding 2. One end of the tap winding 3 is connected in series with the other end of the common winding 2 through a polarity reversing switch 8 having a pair of switch-over terminals P and N. Taps $t_1$ through $t_9$ are led from the tap winding 3, and an intermediate tap $t_k$ is led from the junction between the common winding 2 and the polarity reversing switch 8. A tap changer 9 is selectively engageable with any one of these taps, and the tap winding 3 is connected through the tap changer 9 with other terminal such as, for example, a neutral point O. The tertiary winding 4 has two terminals 10 and 11.

A compensating transformer 12 comprises a primary winding 12a, a secondary winding 12b and an iron core 12c. The secondary winding 12b of the compensating transformer 12 is connected in series with the tertiary winding 4, while the primary winding 12a of the compensating transformer 12 is connected at opposite ends to the intermediate tap $t_k$ and the tap changer 9, respectively. Therefore, the compensating transformer 12 is always energized by the operating tap voltage, that is, voltage of the tap winding portion through which the load current flows, and voltage proportional to the operating tap voltage can be supplied to the circuit of the tertiary winding 4.

Those elements including the series winding 1, common winding 2, tap winding 3, tertiary winding 4, iron core 5, polarity reversing switch 8 and tap changer 9 are accommodated in a common container 13, while the compensating transformer 12 is accommodated in another container 14. The compensating transformer 12 may be accommodated in the container 13 for the autotransformer proper so as to dispense with the container 14.

Here, suppose that the tap changer 9 is in a reference position when it is connected to the intermediate tap $t_k$ and the voltage induced in the tertiary winding 4 in the above position of the tap changer 9 is a reference voltage. Suppose further that the primary side for energizing with a fixed voltage is the high voltage side. Then, the autotransformer apparatus takes the highest tap position when the polarity reversing switch 8 is urged to the position of the terminal P so that the magnetomotive force is produced in the tap winding 3 in the same direction as the magnetomotive forces produced in the common winding 2 and the series winding 1 and the tap winding 3 is operated at a position of the tap $t_9$. On the other hand, the autotransformer apparatus takes a lowest tap position when the polarity reversing switch 8 is urged to the position of the terminal N so that the magnetomotive force is produced in the tap winding 3 in a direction opposite to the magnetomotive forces produced in the common winding 2 and the series winding 1 and the tap winding 3 is operated at a position of the tap $t_1$. Accordingly, as the taps are changed over toward the highest tap position, the induced voltage per turn of the windings is reduced with the result that the voltage across the tertiary winding is stepped down, while as the taps are changed over toward the lowest tap position, the voltage across the tertiary winding 4 is stepped up.

It will be noted however that the compensating transformer 12 is connected in series with the tertiary winding 4 in the present invention so that, when the taps are changed over from the reference position toward the highest tap position, the voltage induced in the secondary side of the compensating transformer 12 has such a polarity that it is added to the voltage induced in the tertiary winding 4 in order to thereby compensate for the voltage drop across the tertiary winding 4 which tends to step down due to tap changing. Similarly, when the taps are changed over from the reference position toward the lowest top position, the voltage induced in the secondary side of the compensating transformer 12 has such a polarity that it is opposite to the polarity of the voltage induced in the tertiaty winding 4 in order to thereby compensate for the voltage across the tertiary winding 4 which tends to step up due to tap changing.

When the capacity of the autotransformer is increased to such an extent that the autotransformer cannot be transported in the form assembled as a single unit, an arrangement as shown in FIG. 2 is preferably employed to increase its transportability.

More precisely, another embodiment of the present invention relates to an autotransformer apparatus which is separated into a main transformer 50 and a regulating transformer 60 which are adapted to be accommodated in independent containers 33 and 36, respectively. The main transformer 50 includes a series winding 21 connected at one end thereof to a high-voltage terminal 26, a common winding 22 having a low-voltage terminal 27 connected to the junction between it and the series winding 21, a tertiary winding 24 coupled magnetically to these windings, and an iron core 25. The tertiary winding 24 has two terminals 30 and 31. The regulating transformer 60 includes a tap winding 23 connected through a terminal 37b to a terminal 37a extending from the other end of the common winding 22, a tap changer 29 selectively engageable with a plurality of taps $t_1$ through $t_9$ provided on the tap winding 23, an energing winding 34 for the tap winding 23, and an iron core 35. The energizing winding 34 is energized by the tertiary winding 24 of the main transformer 50 through terminals 38a, 38b and terminals 39a, 39b. An oil-filled connection duct is preferably used for providing electrical connection between the terminals 37a, 37b, between the terminals 38a, 38b and between the terminals 39a, 39b so as to reduce the size of insulation between the terminal pairs.

Reference numeral 32 designates a compensating transformer which is herein shown as being accommodated in the container 33 which holds the main transformer 50. The compensating transformer 50 comprises a primary winding 32a, a secondary winding 32b and an iron core 32c. The secondary winding 32b of the compensating transformer 32 is connected in series with the tertiary winding 24 of the main transformer 50, while the primary winding 32a of the compensating transformer 32 is connected at opposite ends to the other end of the common winding 22 and to the tap changer 29 through a terminal 40, respectively, so that it is energized by the operating tap voltage of the tap winding 23.

In this embodiment too, a voltage variation occurring in the tertiary winding 24 due to tap changing can be suppressed to a minimum by the compensating transformer 32. While the present embodiment illustrates a case in which the compensating transformer 32 is accommodated in the container 33 for the main transformer 50, the compensating transformer 32 may be accommodated in the container 36 for the regulating transformer 60.

FIG. 3 illustrates a further embodiment of the present invention in which the tap winding is divided into a coarse tap winding and a close tap winding. The autotransformer apparatus includes a series winding 61 connected at one end to a high-voltage terminal 67, a common winding 62 connected in series with the other end of the series winding 61, a coarse tap winding 63 connected at one end in series with the common winding 62, a close tap winding 64 connected to either end of the coarse tap winding 63 through a transfer switch 69 having a pair of switch-over terminals P and N, and a tertiary winding 65 coupled magnetically to these windings through an iron core 66.

Taps $t_1$ through $t_9$ are provided on the close tap winding 64, and an intermediate tap $t_k$ is led from the junction between the common winding 62 and the coarse tap winding 63. A tap changer 70 is selectively engageable with these taps. The close tap winding 64 is connected through the tap changer 70 with another terminal such as, for example, neutral point O of the three phase. A low-voltage terminal 68 is led from the junction between the series winding 61 and the common winding 62. The tertiary winding 65 has two terminals 71 and 72.

Reference numeral 73 designates a compensating transformer which comprises a primary winding 73a, a secondary winding 73b and an iron core 73c. The secondary winding 73b of the compensating transformer 73 is connected in series with the tertiary winding 65, while the primary winding 73a of the compensating transformer 73 is connected at opposite ends to the junction between the common winding 62 and the coarse winding 63 and to the neutral point O, respectively, so that it is energized by the operating tap voltage of the tap winding.

According to this embodiment, the autotransformer apparatus takes a highest tap position when the transfer switch 69 is urged to the position of the terminal P to connect the coarse tap winding 63 between the common winding 62 and the close tap winding 64 in series relation with each other and the tap changer 70 is positioned opposite to the tap $t_9$. On the other hand, the autotransformer apparatus takes a lowest tap position when the transfer switch 69 is urged to the position of the terminal N to disconnect the coarse tap winding 63 from the circuit and the tap changer 70 is positioned opposite to the tap $t_1$.

There is a variation between the induced voltage per turn of the windings when the autotransformer apparatus is operated at the highest tap position and the induced voltage per turn of the windings when the apparatus is operated at the lowest tap position, resulting in a large variation in the voltage induced in the tertiary winding 65. However, it will be understood that such a voltage variation in the tertiary winding 65 can be compensated by the compensating voltage supplied from the primary side to the secondary side of the compensating transformer 73 so that the voltage across the tertiary winding 65 can be maintained at a substantially constant value.

One practical example of the present invention will be described in detail by reference to the embodiment shown in FIG. 1.

It is supposed herein that the autotransformer apparatus has the following specifications.

Voltage specifications of windings:
    Line voltage at high-voltage side—500 kv.
    Line voltage at low-voltage side and its regulatable range—287 kv.±7%
    Voltage of tertiary winding—22 kv.
Connection system of windings:
    Series winding and common winding—Star connection ($\lambda$)
    Tertiary winding—Delta connection ($\Delta$)
No. of turns of windings:
    Series winding—426 turns
    Common winding—574 turns
    Tertiary winding—76 turns
    Tap winding—At highest tap position, +105 turns; at lowest tap position, −87 turns
        (In the number of turns of the tap winding, the symbol (+) shows that the tap winding is connected in such a manner that the voltage induced therein is added to the voltage of the series winding and the voltage of the common winding, while the symbol (−) shows that the tap winding is connected in such a manner that the voltage induced therein cancels the voltage of the series winding and the voltage of the common winding.)
Transformation ratio of compensating transformer: 1:0.0755

Consider now the terminal voltage of the tertiary winding in an autotransformer apparatus having the specifications described above.

(1) The terminal voltage of the teritary winding without the provision of the compensating transformer is $$V_1 = \frac{500 \text{ kv.}/\sqrt{3}}{426+574+105} \times 76 = 19.85 \text{ kv.}$$

at the highest tap position, and $$V_2 = \frac{500 \text{ kv.}/\sqrt{3}}{426+574-87} \times 76 = 24.0 \text{ kv.}$$

at the lowest tap position. Thus, the maximum variation in the voltage induced in the tertiary winding due to tap changing is 9.78% with respect to the reference voltage 22 kv.

(2) The terminal voltage of the teritary winding with the provision of the compensating transformer is $$V_1' = V_1 + \frac{500 \text{ kv.}/\sqrt{3}}{426+574+105} \times 105 \times 0.0755 = 21.92 \text{ kv.}$$

at the highest tap position, and $$V_2' = V_2 - \frac{500 \text{ kv.}/\sqrt{3}}{426+574-87} \times 87 \times 0.0755 = 21.925 \text{ kv.}$$

at the lowest tap position. Thus, the maximum variation in the voltage induced in the tertiary winding due to tap changing is 0.364% with respect to the reference voltage 22 kv. Suppose that a current of 1000 a. flows through the tertiary winding in this case, then the capacity per phase of the compensating transformer will approximately be as follows:

$$2.15 \text{ kv.} \times 1000 \text{ a.} = 2150 \text{ kva.}$$

While the above example refers to the case in which the voltage at the series winding side or the high-voltage side is constant, it will be understood that the voltage at the common winding side or the low-voltage side may be kept constant so as to similarly maintain the voltage of the tertiary winding substantially constant.

What is claimed is:

1. An autotransformer apparatus having a series winding, a common winding, a tap winding disposed in series relation with said series and common windings, and a tertiary winding magnetically coupled to at least one of said windings, said autotransformer apparatus comprising a compensating transformer disposed in the circuit of said tertiary winding for compensating for the fluctuating voltage of said tertiary winding which voltage is variable depending on the tap regulation of said tap winding.

2. An autotransformer apparatus as claimed in claim 1, in which said tertiary winding is magnetically coupled to all of said series winding, common winding and tap winding.

3. An autotransformer apparatus as claimed in claim 1, in which said compensating transformer is accommodated in a container which is independent of a container for accommodating therein said series winding, common winding, tap winding and tertiary winding.

4. An autotransformer apparatus comprising a main transformer having a series winding, a common winding and a tertiary winding which are magnetically coupled to each other, a compensating transformer having a primary winding and a secondary winding which is connected in series with said tertiary winding, a first container for accommodating therein said main transformer and said compensating transformer, a regulating transformer having a tap winding which is connected at one end to said common winding and at the other end to a neutral point through a tap changer and an energizing winding for energizing said tap winding from the tertiary winding of said main transformer, and a second container for accommodating therein said regulating transformer, the primary winding of said compensating transformer being energized by the operating tap voltage of said regulating transformer.

5. An autotransformer apparatus comprising a main transformer having a series winding, a common winding and a tertiary winding which are magnetically coupled to each other, a first container for accommodating therein said main transformer, a regulated transformer having a tap winding which is connected at one end to said common winding and at the other end to a neutral point through a tap changer and an energizing winding for energizing said tap winding from the tertiary winding of said main transformer, a compensating transformer having a primary winding which is energized by the operating tap voltage of said regulating transformer and a secondary winding which is connected in series with said tertiary winding, and a second container for accommodating therein said regulating transformer and said compensating transformer.

6. An autotransformer apparatus having a series winding, a common winding, a tap winding disposed in series relation with said series and common windings, and a tertiary winding magnetically coupled to said windings, said autotransformer apparatus comprising a compensating transformer having its secondary side connected in series with said tertiary winding, the primary side of said compensating transformer being energized by the operating tap voltage of said tap winding for compensating for a variation in the voltage of said tertiary winding due to tap changing.

7. An autotransformer apparatus having a series winding, a common winding a coarse tap winding connected in series with said series and common windings. a close tap winding disposed in series relation with said series and common windings and selectively connectable with said coarse tap winding, and a tertiary winding magnetically coupled to at least one of said windings, said autotransformer apparatus comprising a compensating transformer disposed in the circuit of said tertiary winding for compensating for the fluctuating voltage of said tertiary winding which voltage is variable depending on tap regulation of said tap winding.

References Cited
UNITED STATES PATENTS

| | | | |
|---|---|---|---|
| 1,793,074 | 2/1931 | Fischer | 323—43.5 |
| 2,041,177 | 5/1936 | Harz | 323—43.5 |
| 3,200,325 | 8/1965 | Takeda | 323—43.5 |

J D MILLER, Primary Examiner

G. GOLDBERG, Assistant Examiner

U.S. Cl. X.R.

323—47, 54; 336—148, 150